United States Patent Office 3,383,230
Patented May 14, 1968

3,383,230
PHOSPHORIC ACID BONDED ASBESTOS FIBER
SHEETS AND METHOD OF MANUFACTURE
William Charles Streib, North Plainfield, and Chung-Hsiung Shuih, South Somerville, N.J., assignors to Johns-Manville Corporation, New York, N.Y., a corporation of New York
No Drawing. Filed Nov. 22, 1965, Ser. No. 509,160
12 Claims. (Cl. 106—286)

ABSTRACT OF THE DISCLOSURE

Molded asbestos sheets containing about 25–50% by weight of asbestos fibers, about 20–40% by weight of a bonding medium consisting of a dry concentrate of phosphoric acid and calcium silicate, and the balance inert filler, are prepared by first absorbing liquid phosphoric acid or inorganic phosphate on calcium silicate to form in the dry concentrate, then mixing the dry concentrate with the asbestos fibers and the filler, and molding the mixture under heat and pressure. The product has high flexural strength and good electrical properties.

---

This invention relates to asbestos fiber products and specifically to molded or sheet products which comprise fibrous materials containing asbestos. The invention is particularly concerned with the production of an improved quality phosphoric acid bonded asbestos fiber molded product.

The bonding characteristics of phosphoric acid with asbestos fibers have long been recognized. Sheet products have been made by several techniques and have been used in electrical application such as arc chutes. The advantages of phosphoric acid in bonding asbestos fibers were early recognized and the patent to Greider et al., No. 2,567,559 presents a good explanation of the art.

According to this teaching, asbestos fiber paper products which had initially been bonded with organic binders lacked certain physical properties and specifically the resistance to heat, water, rotting, and other deteriorating influences. The impregnation of such paper with inorganic binders for the production of molded products has likewise had disadvantages since the majority of these binders are silicate-based and the impregnated product, upon drying, becomes a hardened glass-like mass so that the dry product is rigid, boardy, and brittle, and cracks readily when flexed. Thus, the Greider et al. patent taught an early concept of producing a board product which would be bonded by phosphoric acid or similar materials to produce a flexible sheet-like product without the disadvantages of previous organic binders or the silicate-based inorganic binders.

While this introduced a new principle for asbestos fiber molded products, the present commercial products have nevertheless possessed certain disadvantages. Specifically, the liquid nature of the acid requires extended mixing cycles, whether it be with the asbestos fiber alone or other additives which are used to produce the final product. The extended mixing cycle results in an excessive and premature reaction between the acid and the asbestos fiber and consequently deleteriously affects the physical properties of the resulting molded article and particularly the flexural strength and water absorption.

It is, therefore, a principal object of this invention to provide a new technique for producing phosphoric acid bonded asbestos fiber molded products whereby the disadvantages of the prior art are overcome.

It is a further object of this invention to provide an improved phosphoric acid bonded asbestos fiber product having a high degree of flexural strength and good electrical properties without any of the normal physical disadvantages surrounding the prior art product.

It is an additional object of this invention to provide a new method of manufacturing the novel products discussed in the foregoing objects.

Other objects and further scope of applicability of the present invention will become apparent from the detailed description given hereinafter. It should be understood, however, that the detailed description, while indicating preferred embodiment of the invention, is given by way of illustration only, since various changes and modifications within the spirit and scope of the invention will become apparent to those skilled in the art from this detailed description.

It has now been discovered that the foregoing objects may be satisfied and the above-discussed properties achieved by employing a dry concentrate of the phosphoric acid as a bonding medium with asbestos fiber in making a high strength pressed sheet. The dry concentrate is preferably achieved by absorbing the liquid acid upon a hydrothermally prepared calcium silicate such as that commercially available under the trademark Micro-Cel. The dry nature of the acid concentrate provides mixing and dispersion throughout the mix of asbestos fiber and additives superior to that accomplished by the heretofore method employing the liquid acid directly with the fiber and filler. The improved dispersion of the acid in turn produces final products of significantly improved properties.

As used in the instant specification and claims, the term asbestos is intended to include other commercial varieties of asbestos and specifically, chrysotile, anthophyllite, actinolite, tremolite, crocidolite, amosite, various amphibole fibers and Canadian picrolite. The amount of asbestos fiber used may vary between 25 and 50 percent by weight of the product dependent upon the desired physical properties.

In addition to phosphoric acid, other soluble inorganic phosphates in liquid form are effective in the practice of the invention in order to achieve a bonded asbestos sheet. Those water-soluble inorganic phosphates which are preferably employed in the practice of this invention include sodium acid pyrophosphate, potassium acid pyrophosphate, sodium pyrophosphate, monobasic and tribasic sodium phosphate, monobasic, dibasic and tribasic ammonium phosphate, potassium phosphate, barium orthomonophosphate, magnesium hydrogen phosphate, chromium phosphate, aluminum acid phosphate and magnesium biphosphate. The magnesium hydrogen phosphate abovementioned constitutes an abbreviated designation for magnesium phosphate which is normally insoluble but which has been dissolved in the presence of about two molar equivalents of phosphoric acid. Other examples of water-soluble inorganic phosphates which provide a bonded sheet-like body comprise asbestos fibers according to this invention are aluminum acid phosphate, potassium pyrophosphate, dibasic and tribasic potassium phosphate, sodium ammonium phosphate, sodium dibasic phosphate, sodium metaphosphate, sodium hexametaphosphate, and potassium metaphosphate. The term "phosphoric acid" as used herein and in the claims includes any hydrate of phosphoric acid. The lower hydrates of phosphoric acid such as the meta- and pyro-phosphates tend to hydrolyze when in water solution to ortho phosphate form.

The amount of phosphate dry concentrate may vary, but in order to produce an effected bonded product it should range between about 20 percent and 40 percent of the total by weight composition.

Various inert fillers may be used as additives dependent upon the desired final properties and may include rock wool, slag wood, glass fibers, perlite, diatomaceous silica, talc, mica, or zirconium silicate in amounts between about 8 and 40 percent.

The calcium silicates of the instant invention are preferably those prepared by a hydrothermal reaction of a siliceous material such as diatomaceous silica with lime in a water medium. Preparation of these hydrated calcium silicates may utilize any one of several reactive siliceous materials as a starting material such as the diatomaceous silica, quartz, or silica gel, but preference is expressed for finely divided diatomaceous silica. Similarly the calcium hydroxide source is any one of several materials with finely divided hydrated lime being preferred. The mol ratio of CaO to $SiO_2$ may vary between about 0.5 and 1.5.

Typical products resulting from the reactions are finely divided particulate or granular porous products having a wet cake density varying between about 9 to 20 pounds per cubic foot. While distinct preference is expressed for the hydrothermally prepared calcium silicate, other commercially available silicate products such as those prepared by the precipitation technique, e.g., between calcium chloride and sodium silicate, are likewise applicable while not providing as effective an absorbent. Generally speaking, however, an amount of calcium silicate equivalent to between about 5 and 20 percent by weight of the molded composition is effective.

The amount of silicate used is somewhat dependent upon the particular $CaO:SiO_2$ mol ratio and, therefore, dependent upon the basic characteristics of the silicate, and the actual acidic characteristics of the phosphoric component inasmuch as a reaction is effected between the phosphoric acid and the calcium silicate.

This may be better understood by reference to specific illustrations. The phosphoric acid used in the examples herein is a standard grade of 85 percent acid and 15 percent water. The calcium silicate used had a $CaO:SiO_2$ mol ratio of about 0.5. It was determined that in a 70 percent dry concentrate of the two, wherein the acid comprises 70 percent of the total weight of the concentrate, only 50 percent of the acid was free as phosphoric acid, wherein the remainder had reacted with the calcium silicate to produce a combination of acid phosphates. Saying it another way, for these two specific components it requires 35 percent acid, based on the total weight of the concentrate, to react with the silicate before any acid would be available as such to react with the asbestos. Of course, depending on the solubility of the various acid phosphates formed and their respective reaction rates, each of these may likewise enter into a reaction with the asbestos fiber similar to that of the free phosphoric acid.

X-ray diffraction patterns for a 35 percent concentrate of these two components showed very little calcium silicate pattern, strong $CaHPO_4$ pattern, and some $CaH_2PO_4$ pattern. For the 50 percent concentrate, there was no calcium silicate pattern, a strong $CaH_2PO_4$ pattern, and a weak $CaHPO_4$ pattern. The 70 percent concentrate gave no calcium silicate pattern, a very strong $CaH_2PO_4$ pattern, and a weak $CaHPO_4$ pattern.

In the following examples, sheets of phosphoric acid bonded asbestos fiber were prepared in accordance with standard techniques. The process for making a panel involved mixing asbestos fiber, specifically grade 5R, with zirconium silicate which functions as a filler, and phosphoric acid absorbed upon a calcium silicate as a binder. These ingredients were mixed and the composition molded at 300° F. and 3000 p.s.i. Thereafter the sheets were cured at 600° F. for eight hours and tested for various properties. Comparisons were made with molding compositions using (a) no calcium silicate and (b) amounts of silicate as a filler per se equal to the amount of silicate initially in each sample of concentrate. As will be demonstrated below in Table 1, the use of the calcium silicates as an absorbent for the dry concentrate of the phosphoric acid enabled better mixing and, therefore, produced a better product. The invention is, therefore, directed both to the process of producing products and the resulting products.

A comparison of the data presented in Table 1 illustrates in Examples I through V molding compounds containing phosphoric acid alone (Example I) and various amounts of calcium silicate as a filler per se (Examples II to V), as contrasted with molding compounds containing the same quantities of phosphoric acid and a calcium silicate combined as a dry concentrate (Examples VI to IX). The improved results in flexural strength, both wet and dry, density, and water absorption, coupled with the observed surface appearance demonstrates the significant advantages of the instant invention. Accordingly it is seen that vast improvements can be achieved by the instant technique in producing molded phosphoric acid bonded asbestos fiber sheets.

TABLE 1.—PHOSPHORIC ACID BONDED ASBESTOS

[Comparison between the control panels (Examples I-V) and the instant invention (Examples VI-IX)]

| Example No. | Phosphoric Acid, percent | Calcium Silicate, percent | Zirconium Silicate, percent | Fiber, percent | Flexural Strength, p.s.i. dry | Flexural Strength, p.s.i. wet | Density g./cm.³ | Water Absorption, percent | Surface Appearance |
|---|---|---|---|---|---|---|---|---|---|
| I a | 25 | | 40 | 35 | 2,990 | 1,770 | 2.38 | 8.3 | } Poor. |
| b | | | | | 2,400 | 1,420 | 2.40 | 8.15 | |
| II | 20 | 8.6 | 36.4 | 35 | 1,080 | 570 | 1.83 | 20.7 | Do. |
| III | 25 | 10.7 | 29.3 | 35 | 1,540 | 733 | 1.86 | 18.5 | Do. |
| IV | 30 | 12.3 | 22.7 | 35 | 2,550 | 1,225 | 1.85 | 18.0 | Do. |
| V | 40 | 17.2 | 7.8 | 35 | 2,320 | 1,365 | 1.78 | 16.7 | Do. |
| | Dry Concentrate | | | | | | | | |
| | Acid | Calcium Silicate [1] | | | | | | | |
| VI a | ² 20 | 8.6 | 36.4 | 35 | 4,710 | 3,333 | 2.11 | 13.1 | } Good. |
| b | | | | | 4,870 | 2,540 | 2.17 | 13.0 | |
| VII a | 25 | 10.7 | 29.3 | 35 | 4,520 | 3,220 | 2.10 | 11.8 | } Do. |
| b | | | | | 4,920 | 3,700 | 2.18 | 10.9 | |
| VIII a | 30 | 12.3 | 22.7 | 35 | 4,080 | 2,840 | 2.03 | 12.2 | } Do. |
| b | | | | | 3,330 | 2,450 | 2.07 | 11.1 | |
| IX a | 40 | 17.2 | 7.8 | 35 | 1,980 | 940 | 1.72 | 17.3 | } Fair. |
| b | | | | | 1,900 | 1,300 | 1.87 | 13.9 | |

[1] Initially.  ² 50% effective.

It is believed the above provides a complete description of the invention in such manner as to distinguish it from other inventions and from what is old, and provides a description of the best mode contemplated of carrying out the invention and thereby complies with the patent statutes.

It is to be understood that variations and modifications of the invention, as illustrated by specific examples herein, may be made without departing from the spirit

What we claim is:

1. In the manufacture of phosphate bonded asbestos fiber sheets the steps comprising, preparing a dry concentrate of a liquid phosphate by absorbing said phosphate upon powdered calcium silicate in amount greater than 35 percent by weight of the concentrate, mixing the resulting dry concentrate with filler and asbestos fiber, and thereafter molding the composition under heat and pressure to form a sheet product, said asbestos constituting about 25–50% by weight of said product.

2. A process as defined in claim 1 wherein said dry concentrate is used in amount between about 20 and 40 percent by weight, the asbestos fibers are used in an amount between about 25 and 50 percent by weight and the remainder is inert filler.

3. A process as defined in claim 2 wherein said filler is zirconium silicate in an amount between about 8 and 40 percent.

4. A process as defined in claim 2 wherein said calcium silicate is hydrothermally prepared calcium silicate having a $CaO:SiO_2$ mol ratio of between 0.5 and 1.5.

5. A process as defined in claim 1 wherein said dry concentrate is prepared by absorbing at least 50 percent liquid phosphate by weight of the concentrate.

6. A process as defined in claim 4 wherein said dry concentrate is prepared by absorbing at least 70 percent liquid phosphate by weight of the concentrate.

7. A process as defined in claim 1 wherein said liquid phosphate is phosphoric acid.

8. A phosphate bonded asbestos sheet comprising 20 to 40 percent by weight of dry concentrate of a liquid phosphate absorbed upon powdered calcium silicate in an amount greater than 35 percent by weight of said concentrate, 25 to 50 percent by weight asbestos fibers, and the remainder inert filler.

9. A sheet as defined in claim 8 wherein the calcium silicate is hydrothermally prepared calcium silicate having a $CaO:SiO_2$ mol ratio of between about 0.5 and 1.5.

10. A sheet as defined in claim 8 wherein said liquid phosphate is absorbed upon said silicate in an amount greater than 50 percent by weight of said concentrates.

11. A sheet as defined in claim 8 wherein said liquid phosphate is absorbed upon said silicate in an amount greater than 70 percent by weight of said concentrate.

12. A sheet as defined in claim 8 wherein said filler is zirconium silicate in an amount between about 8 percent and 40 percent.

References Cited

UNITED STATES PATENTS

| 2,093,454 | 9/1937 | Kistler | 252—6 |
| 2,687,967 | 8/1954 | Yedlick et al. | 106—286 |
| 2,808,338 | 10/1957 | Bruno et al. | |

FOREIGN PATENTS

| 680,116 | 2/1964 | Canada. |

ALEXANDER H. BRODMERKEL, *Primary Examiner.*

T. MORRIS, *Assistant Examiner.*

UNITED STATES PATENT OFFICE
CERTIFICATE OF CORRECTION

Patent No. 3,383,230         May 14, 1968

William Charles Streib et al.

It is certified that error appears in the above identified patent and that said Letters Patent are hereby corrected as shown below:

Columns 3 and 4, TABLE 1, sixth column, line 12 thereof "3,330" should read -- 3,300 --; same TABLE, seventh column line 7 thereof, "3,333" should read -- 3,330 --; same TABLE, seventh column, line 9 thereof, "3,220" should read -- 3,200 --.

Signed and sealed this 4th day of November 1969.

(SEAL)
Attest:

Edward M. Fletcher, Jr.　　　　　　　　WILLIAM E. SCHUYLER, JR.
Attesting Officer　　　　　　　　　　　Commissioner of Patents